United States Patent
Angelhag

(10) Patent No.: US 8,195,145 B2
(45) Date of Patent: Jun. 5, 2012

(54) USER INTERFACE UNIT FOR A TELEPHONE

(75) Inventor: Anders Angelhag, Lund (SE)

(73) Assignee: Sony Mobile Communications AB, Lund (SE)

( * ) Notice: Subject to any disclaimer, the term of this patent is extended or adjusted under 35 U.S.C. 154(b) by 617 days.

(21) Appl. No.: 10/554,771

(22) PCT Filed: Apr. 16, 2004

(86) PCT No.: PCT/EP2004/050547
§ 371 (c)(1),
(2), (4) Date: Oct. 28, 2005

(87) PCT Pub. No.: WO2004/098164
PCT Pub. Date: Nov. 11, 2004

(65) Prior Publication Data
US 2007/0042809 A1    Feb. 22, 2007

Related U.S. Application Data

(60) Provisional application No. 60/468,434, filed on May 7, 2003.

(30) Foreign Application Priority Data

Apr. 29, 2003  (EP) .................................... 03445050

(51) Int. Cl.
*H04M 3/00* (2006.01)
(52) U.S. Cl. ........................................... 455/420; 701/1
(58) Field of Classification Search .................. 455/420, 455/466
See application file for complete search history.

(56) References Cited

U.S. PATENT DOCUMENTS

| | | | |
|---|---|---|---|
| 6,377,825 B1 * | 4/2002 | Kennedy et al. | 455/569.2 |
| 6,701,161 B1 | 3/2004 | Wendling | 455/566.1 |
| 2002/0032048 A1 * | 3/2002 | Kitao et al. | 455/569 |
| 2003/0090480 A1 * | 5/2003 | Polgar et al. | 345/206 |
| 2003/0109290 A1 * | 6/2003 | Moffi et al. | 455/569 |
| 2003/0114202 A1 * | 6/2003 | Suh et al. | 455/569 |
| 2003/0195010 A1 * | 10/2003 | Pattabiraman et al. | 455/517 |
| 2004/0137967 A1 * | 7/2004 | Bodley | 455/575.2 |

FOREIGN PATENT DOCUMENTS

| | | |
|---|---|---|
| EP | 1 049 347 | 11/2000 |
| EP | 1 084 894 | 3/2001 |
| EP | 1 271 903 | 1/2003 |
| WO | 99/30429 | 6/1999 |

OTHER PUBLICATIONS

International Preliminary Report on Patentability for PCT/EP2004/050547.

* cited by examiner

Primary Examiner — Marcos Batista
(74) Attorney, Agent, or Firm — Myers Bigel Sibley & Sajovec

(57) ABSTRACT

A user interface apparatus for remote control of a telephone having an input adapted for inputting telephone control signals; a display for outputting visual information, a communications unit adapted for short distance wireless signal communication; circuitry adapted to convey input telephone control signals and display control signals between the user interface apparatus and the telephone by the short distance wireless signal communication unit; wherein the circuitry is configured to adapt the input and output signals of the user interface apparatus to have the same properties as corresponding signals of the telephone.

25 Claims, 2 Drawing Sheets

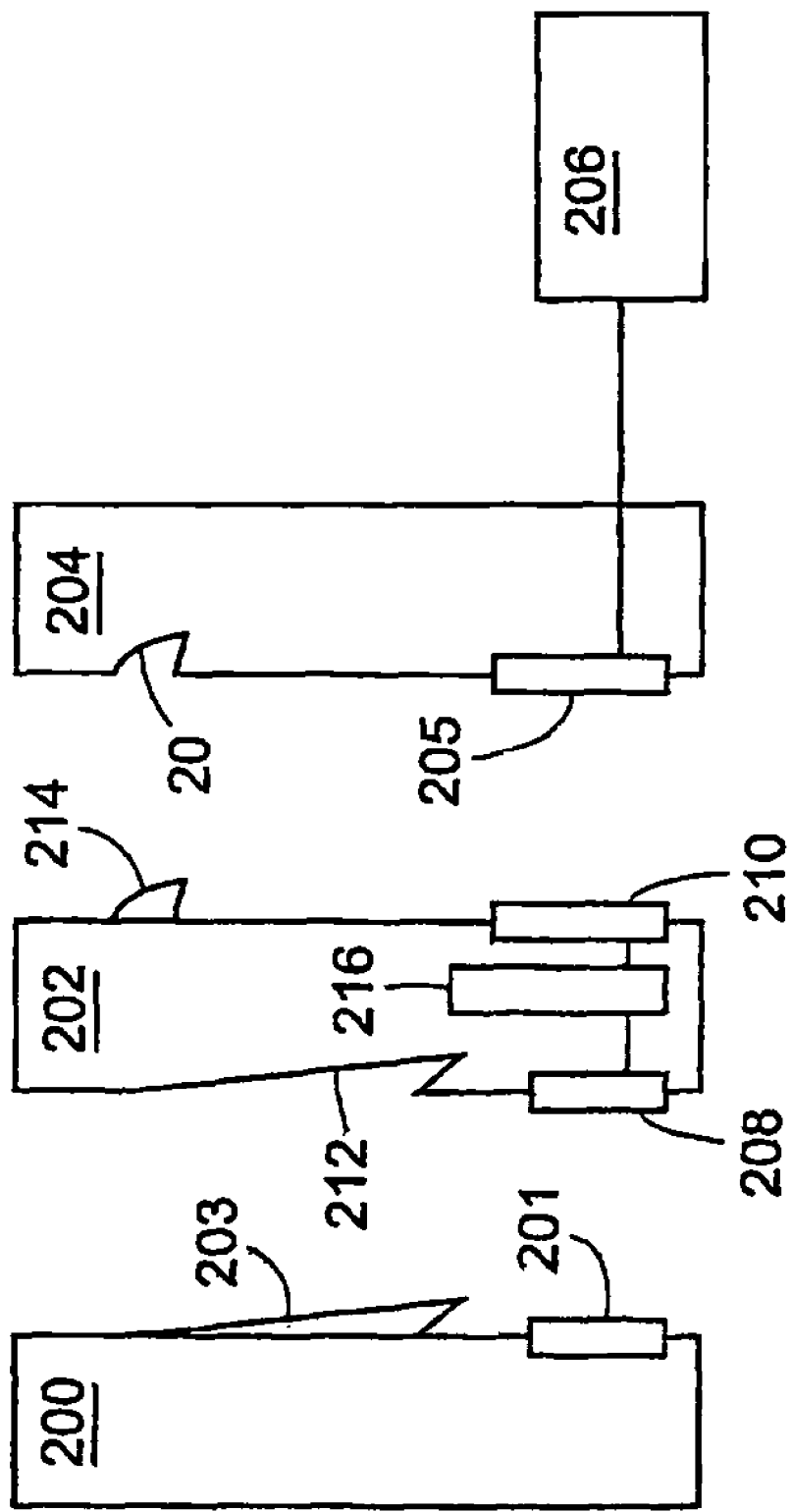

USER INTERFACE UNIT FOR A TELEPHONE

RELATED APPLICATIONS

The present application is a 35 U.S.C. §371 national phase application of PCT International Application No. PCT/EP2004/050547, having an international filing date of Apr. 16, 2004 and claiming priority to European Patent Application No. 03445050.2, filed Apr. 29, 2003 and U.S. Provisional Application No. 60/468,434 filed May 7, 2003, the disclosures of which are incorporated herein by reference in their entireties. The above PCT International Application was published in the English language and has International Publication No. WO 2004/098164.

TECHNICAL FIELD

The present invention relates in general to user interfaces for communicating with and controlling telephone equipment. More particularly, the present invention relates to a user interface for wireless communication with telephone equipment.

BACKGROUND

In order to make the usage of mobile telephones in vehicles safer it is common to have hands free equipment stationary installed in the vehicle for audio input to and output from the telephone. The hands free equipment is provided with a connector for connecting a loudspeaker, a microphone and a power line to the telephone. In stationary hands free equipment the connector is often integrated with a docking unit with a holder fitting the telephone. The docking unit is usually mounted on the instrument panel of the vehicle within reach for the user, and when the mobile telephone unit is docked in the holder the telephone is controlled by means of the usual keypad and display on the telephone. There may also be some basic control keys integrated with or attached to the steering wheel. Some stationary hands free equipment is further coupled to an entertainment system or a vehicle information system of the vehicle, so that for example the audio output of a radio or a music player is switched off or silenced when an incoming telephone call is received.

There is also simpler hands free equipment such as a cable with an earphone, a microphone and a connector for connecting directly to an input/output socket of the telephone unit. There may also be a switch on the cable for basic control of the telephone such as answering or ending a call. Dialling and other handling of the telephone is done by means of the keypad and the screen of the telephone.

However, modern mobile telephones are small and for example in the vehicle environment it is often difficult to read the small screen of the telephone and to use the small keypad when handling the telephone and telephone calls. There are also other environments, circumstances or situations when it is unpractical or unsuitable to handle the telephone unit by means of the integrated keypad and screen.

Furthermore, there are technologies for coupling a stationary mounted hands free equipment wirelessly to a mobile telephone unit whereas the telephone might be left in a case or pocket and the user interface of the telephone may thus be out of hand.

There is therefore a need for a complementary user interface for mobile telephones.

PRIOR ART

There are examples of prior art with regard to user interfaces for hands free equipment inter alia in the following patent publications.

In WO 98/57434 there is disclosed a car radio with a removable control and telephone unit. This apparatus is a car radio with a base unit that is stationary mounted in a vehicle and coupled to hands free telephone equipment. A detachable operating and telephone unit is provided with a key panel for operating the telephone and at least some functions of the car radio, a display for telephone and car radio functions, and a connector interface for connecting telephone antenna, audio lines, control lines and power supply. When the operating and telephone unit is dismounted it can be used as an autonomous mobile telephone, and when attached to the base unit it can be used as a hands free mobile telephone or car radio control device.

In GB 2 292 857 A there is disclosed a radio communication device with a radio receiver and a visual output interface via a mirrored surface, i.e. the information that is normally displayed on a screen is presented via or through a mirror surface. Input of control signals to the radio receiver is enabled via touch responsive areas on the mirror surface or via a keypad. The keypad is devised for wireless communication with the device by means of an infra red communication link.

In FR 2 779 598 A there is disclosed a universal hands free it for use with different types of mobile telephones. An autonomous device with a microphone and a loudspeaker is connectable to a variety of mobile phones via a connector interface that is adaptable to different types of mobile phones. The device is provided with an input/output port for connecting different accessories, such a message recorder, a vibration call indicator, a wireless microphone and a remote control keypad.

In DE 297 23 162 U1 there is disclosed a hands free system for a mobile telephone. The mobile telephone has an additional contact device that enables the telephone to be electrically connected to a spatially separate parallel keyboard installed in the hands free system The parallel keyboard can be operated with a connection to the contact device that is parallel to the keyboard of the mobile telephone and has at least partially identical functions.

In EP 1 084 894 A2 there is disclosed a multimedia unit for a vehicle with a control panel that is detachable from a stationary installed base unit. The detachable control panel is provided with a touch sensitive display operating together with a processor for controlling different functions such as a telephone, a radio, a CD-player and traffic information display. The detachable control panel is provided with an autonomously usable radio telephone having means for direct access to a radio telephone network There are also products available on the market for wirelessly connecting a stationary mounted hands free system with a mobile telephone unit. An example of such a product is the Sony Ericsson Bluetooth™ Car Handsfree HCB-30, which currently is shown on the www.sonyericsson.com Internet website. This hands free equipment communicates with a telephone unit via a short distance radio communication according to the standard technology that goes under the trade mark Bluetooth™. The HCB-30 connects automatically with a mobile telephone unit correspondingly being provided with Bluetooth™ functionality without placing the telephone unit in any particular position, and therefore the telephone can remain in for example a pocket or a case. The user controls basic functions of the telephone via a keypad mounted on the dashboard and designed as a five button control panel configured to activate the telephone, control loudspeaker volume, and to answer or reject calls. Another similar product is the Sony Ericsson Advanced Car Handsfree HCA-20, also currently shown on the www.sonyericsson.com Internet website.

The HCA-20 is further provided with means for voice recognition to enable voice dialing as a means for controlling the telephone. It also has functionality for muting a car stereo for incoming calls.

PROBLEM TO BE SOLVED BY THE INVENTION

The general problem that the invention seeks to solve is to achieve a satisfactory user interface for operating a telephone.

An aspect of the problem deals with hands free equipment that communicates wirelessly with a telephone unit, for example by means of short distance radio communication such as Bluetooth™ technology. In this connection the user interface of the hands free equipment only allows a limited control of the telephone. For example, there is no possibility to enter a telephone number to the telephone and there is no visual control feedback or other visual information from the telephone to the user via the hands free equipment Another aspect of the problem is that the user interface of the telephone with its capability of two-way communication with the user may for circumstantial reasons not be sufficiently accessible or available.

Yet another aspect of the problem is that existing hands free equipment is incompatible with devices for wireless communication with the telephone unit, and when upgrading to such wireless communication between hands free equipment and telephone unit new complete equipment has to be installed.

Another aspect of the problem is that in some applications the user interface of the telephone unit is inappropriate or insufficient for the purpose of the application. Furthermore, for some reasons or in some specific situations it may be inappropriate to use the transmitter or the antenna part of the telephone close to the user or close to the head of the user.

Yet another aspect of the problem is to provide a user interface for a telephone that is adaptable to personal characteristics, properties or needs.

OBJECT OF THE INVENTION

It is therefore a general object of the present invention to provide a user interface for wirelessly communicating with and remotely controlling a telephone unit. A more particular object is to provide a user interface that is connectable to peripheral equipment, such as hands free equipment, and capable of wireless communication with a telephone unit.

SUMMARY OF THE INVENTION

The object of the invention is achieved and the problem is solved by a user interface unit comprising means for wireless short distance communication with a telephone unit, a display for presenting an output of visual information from the telephone unit, and switch means for inputting control signals to the telephone. The user interface unit possibly further comprises circuitry for adapting input control commands to a signal format that is suitable for wireless short distance transmittal and interpretation as control commands in the telephone unit. The invention operates together with a telephone unit that likewise is provided with means for wireless short distance communication and conveys input and output signals between these devices. The user interface unit according to the invention enables an enlarged and enhanced man-machine-interface (MMI) to remotely operate the telephone unit.

One embodiment of the invention comprises adaptation of the telephone unit such that signals corresponding to those of the user input/output interface that is integrated with the telephone unit usually the keypad and the display signals, are also communicated to and from a data processing unit of the telephone via the wireless short distance communication means. This may be performed in parallel with or alternatively to the signal communication of the integrated user input/output interface. Other telephones are already provided with this feature. The invention can be applied together with mobile telephones as well as with stationary installed telephones.

The circuitry of the user interface unit is adapted for receiving, interpreting and presenting on the display visual information that is received wirelessly from the telephone unit. Power supply is preferably arranged by means of a connector adapted to be connected to a power line from for example a vehicle battery or electric mains.

An embodiment adapted to be capable of fully wireless usage is provided with battery slot and battery connectors for housing or attaching and connecting a small battery. Preferably, this embodiment also has a connector to an external power supply or power line and circuitry such that the user interface unit can be powered and its battery loaded while connected. The user interface unit is preferably made in size, e.g. rather small, and fully portable, dependent on the usage purpose of the specific model. This enables usage of the user interface and the telephone in any circumstances where it is convenient or more suitable to operate the telephone from the user interface and have the telephone positioned or placed somewhere else. For example in a tough working or leisure environment such as a construction site or on a beach, it may be advantageous to have the telephone protected in a case or a pocket whereas it operated via a user interface unit that is adapted to the circumstances of usage. For example, the user interface unit can be manufactured in water protected, particle protected or shock protected design and be usable together with any telephone model that is provided with short distance communication means for wireless communication with the user interface unit.

In one embodiment, the user interface unit comprises housing and an electrical connector that detachably fit to a holder for the interface unit. The holder is a docking unit that is electrically connected to peripheral equipment such as audio functionality of bands free equipment, a vehicle entertainment system or a vehicle information system. The holder and the housing can be designed per se and the holder be connected to the electrical wiring of peripheral equipment. Alternatively, the housing can be adapted to fit to holders designed to fit and dock a telephone unit. The latter embodiment would thus fit to existing holders of for example hands free equipment and this equipment is thereby upgradable to operate with a wireless communication with the telephone unit via the user interface unit of the invention.

A further development of this embodiment comprises an adapter piece for adapting shape fitting and connector fitting between a holder and the user interface unit. Thereby, the user interface unit is adaptable to fit a holder for example designed for docking a particular model or model series of telephone. One embodiment of the adapter piece further comprises circuitry configured to adapt a first signal format for peripheral equipment of a first manufacture to a second signal format for a user interface unit of a second manufacture, and vice versa. Similarly, one embodiment of the user interface unit is provided with circuitry configured to adapt a first signal format for a telephone unit of a first manufacture to a second signal format for a user interface unit of a second manufacture, and vice versa.

One aspect of the invention solves the problem aspect that in some applications the user interface of the telephone unit is inappropriate or insufficient for the purpose of the application. One typical such kind of application is for example game applications, that is when the processing power of the telephone is used to run a game and the user interface unit can be configured to an appropriate input/output game interface. Similarly, mobile Internet applications and the like would also benefit from having the more versatile and handy input/output functionality of the user interface unit.

Another aspect of the invention solves the problem aspect that for some reasons or in some specific situations it may be inappropriate to use the transmitter or the antenna part of the telephone close to the user or close to the head of the user. For example, the signal circumstances may be such that the telephone unit is incapable of receiving a signal from the base station in the position where the user wants to or has to be situated. With the user interface unit of the invention, the telephone unit can thus be placed in a suitable position or place and conveniently be operated by means of the separate user interface.

The invention thus enables that a telephone unit and/or peripheral equipment are upgraded or supplemented with an enhanced user interface to a comparatively low cost and without any costly installation. From an environmental point of view it is also environmentally beneficial to upgrade and use existing products rather than changing and throwing them away.

As mentioned above, different configurations and usage situations are conceivable for the invention. For example, the user interface unit may thus be used as a complementary or enhanced user interface to the telephone with the user interface unit docked to a car hands free system and the telephone unit placed somewhere in the car. The user interface can be detached from the hands free system, and as it is portable it can be handed over and used as a telephone interface for example by other passengers somewhere in the car. Similarly, the user interface unit and the telephone unit can be used in any outdoors or indoors situation.

According to an aspect of the invention, the user interface unit is adaptable to personal characteristics, properties or needs. So for example, a disabled person may need a user interface of a certain design, size or disposition of the keys. A person having an impaired vision may need to have keys and visual feedback information in a certain, perhaps variable size or colour. In an embodiment for the purpose of the latter case, the circuitry of the user interface unit comprises software and hardware for adapting a possibly touch sensitive screen to the specific need.

According to a further aspect of the invention, the user interface unit is adapted to provide different selectable or controllable extent of functionality or operability of the telephone. Thus, there may for example be different modes of operation of the telephone via the user interface apparatus, for example a fist mode of operations with a limited selection of operability that is adapted to a safe driving situation, and a second mode of operation with full operability of the telephone. The selection or mode of operation is advantageously controlled dependent on the position of the user interface unit, such as a limited functionality mode of operation is activated when the user interface unit is placed in a car holder and else full functionality mode of operations is activated.

Aspects and embodiments of the invention further comprise different combinations of features as follows.

Described with its basic features the invention concerns a user interface apparatus for remote control of a telephone (104), comprising input means (101B) adapted for inputting telephone control signals; a display (101A) for outputting visual information, communications means (102) adapted for short distance wireless signal communication; and circuitry (103) adapted to convey input telephone control signals and display control signals between the user interface apparatus (100) and the telephone (104) by means of said short distance wireless signal communication means (102). The circuitry (103) is configured to adapt the input and output signals of the user interface apparatus to have the same properties as corresponding signals of the telephone (104).

The user interface apparatus further comprises an electrical connector (105) coupled to the circuitry (103) and adapted to connect to signal lines (107,109) from peripheral equipment (108). For the purpose of detachable docking, the user interface apparatus preferably further comprises mechanical attachment means (118) adapted for detachably attaching the user interface apparatus to corresponding attachment means of a holder. Preferably, the user interface comprises mechanical attachment means (118) adapted for detachably attaching the user interface apparatus to corresponding attachment means (119) of a docking unit (110), and an electrical connector (105) coupled to the circuitry (103) and adapted to connect to a corresponding electrical connector of said docking unit (110).

The inventive concept of the user interface apparatus may further comprise a docking unit (110) adapted for detachably coupling mechanical attachment means (118,119) and for electrically coupling electrical connectors (105,111) of said docking unit (110) and a user interface unit (100), respectively. The user interface apparatus is preferably adapted to be intermediately coupled between and conveying signals between the telephone (104) and peripheral equipment (108). For example, the user interface apparatus is adapted to be intermediately coupled between and conveying signals between the telephone (104) and a peripheral equipment being a bands free system (112); between the telephone (104) and a peripheral equipment being a vehicle information system (116); or between the telephone (104) and a peripheral equipment being an entertainment system (117). Preferred embodiments of the user interface apparatus are further adapted to be coupled to a peripheral equipment being a power supply (128).

For the purpose of fully wireless usage of the user interface apparatus, it may further comprise a connector slot (126) for a battery, said connector slot being coupled to the circuitry (103). The connector slot (126) is preferably coupled to the electrical connector (105) for connecting to a charging peripheral power supply (128). Such an embodiment may also comprise a microphone (130) and a loudspeaker (132) coupled to the circuitry (103), or an input connector (134) coupled to the circuitry (103) for connecting a headset For the purpose of adapting a user interface unit of a first type to a docking unit of a second type there are the following varieties of the invention. The user interface apparatus may comprise an adapter piece (202) configured to mechanically and electrically fit to first mechanical and electrical couplings (203, 201) of a user interface unit (200) and to second mechanical and electrical couplings (205,206) of a docking unit (204). It may further comprise an adapter piece (202) having first mechanical attachment means (212) adapted for detachably attaching to corresponding first mechanical attachment means (203) of a user interface unit (100) and second mechanical attachment means (214) adapted for detachably attaching to corresponding second mechanical attachment means (206) of a docking unit. The an adapter piece (202) preferably also has a first electrical connector (208) adapted for connecting to a corresponding first electrical connector (201) of a user interface unit (100) and a second electrical connector (210) adapted for detachably attaching to a corresponding second electrical connector (205) of a docking unit. The user interface apparatus may further comprise a an circuitry (103,216) configured to adapt first signals of a user interface unit (200) to second signals of peripheral equipment, and vice versa. Alternatively, an adapter piece (202) may have circuitry configured to adapt first signals of a user interface unit (200) to second signals of a docking unit 204.

In an embodiment the display (101A) is touch sensitive and together with the circuitry (103) is configured to realise input keys (101B) for said input means. The user interface apparatus further comprises a portable housing (1) for housing said components. The short distance wireless communication means (102) is preferably based on short distance radio communication, for example according to the Bluetooth standard. The short distance wireless communication means (102) may also be based on infra red signal communication.

In one embodiment the user interface apparatus is further adapted to provide a first mode of operation with a first set of functionality and a second mode of operation with a second set of functionality, said second set of functionality being a subset of said first set of functionality. Preferably, said second mode of operation is activated in response to the user interface being attached to a docking unit.

BRIEF DESCRIPTION OF THE DRAWINGS

The invention will be further explained with reference to the accompanying drawings, in which:

FIG. 2 shows schematically an adapter piece of an embodiment of the inventive user interface.

DETAILED DESCRIPTION OF EMBODIMENTS

Figure 1:
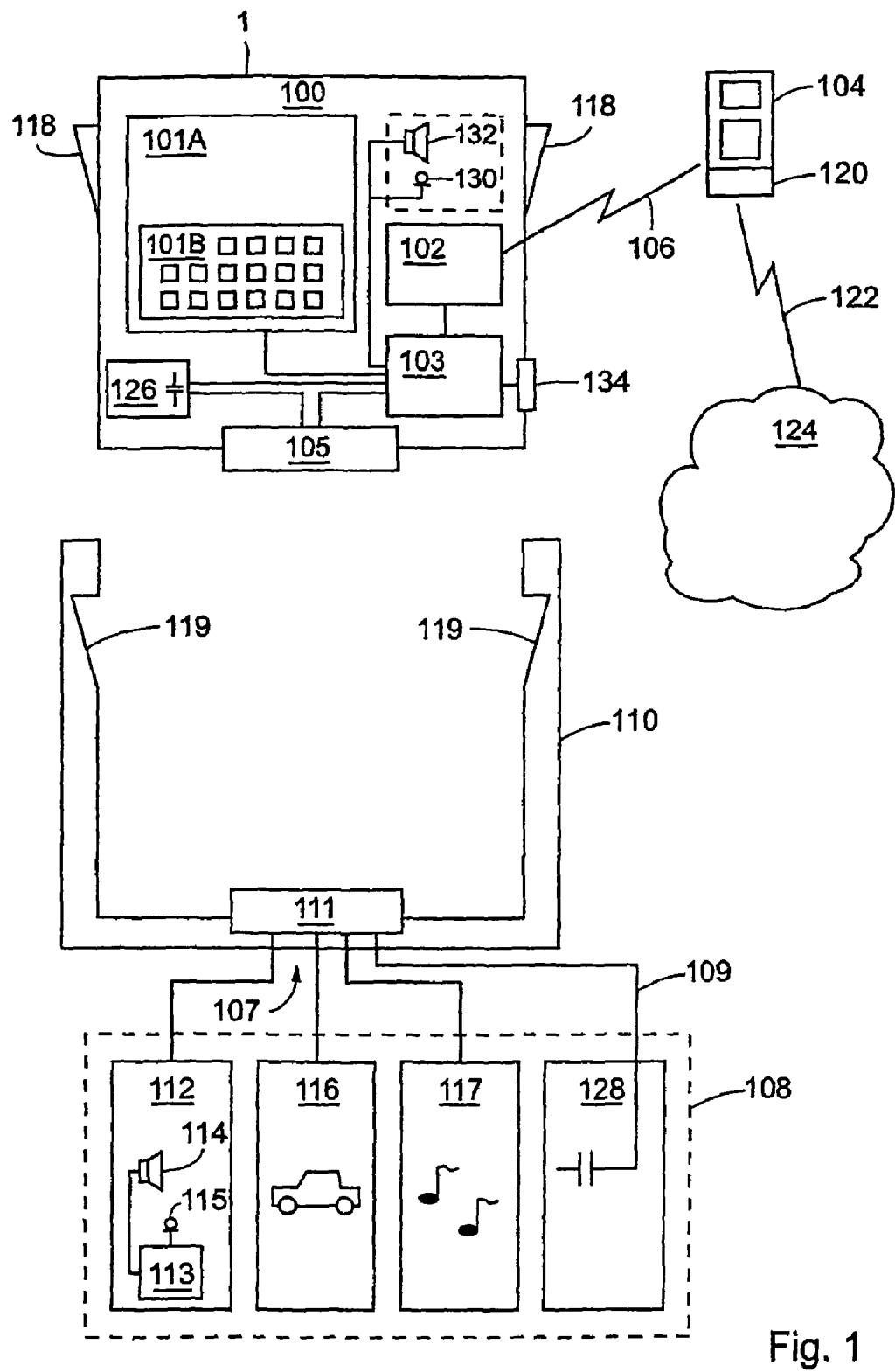
FIG. 1 shows a schematic overview of the user interface according to the invention with co-operating apparatus.

FIG. 1 shows schematically the inventive user interface unit 100 having a housing 1 provided with a visual output display 101A and input switches 101B, means for short distance wireless data or signal communication 102 and driving circuitry 103 coupled to the before mentioned components. The circuitry 103 is configured to drive the output display 101A, the input switches 101B and the short distance communications means 102, and to convey and adapt signals between these components. The input switches 101B are in different embodiments coupled to a key panel of push buttons or integrated in a touch sensitive display with accompanying software for visualising and activating input key areas on the display.

The user interface unit 100 is thus capable of short distance wireless data or signal communication 106 with a telephone unit 104 also having means for short distance wireless data or signal communication 120. Preferably, this short distance wireless communication is realised by means of a radio system for short distance radio communication according to the standard technology that goes under the trade mark Bluetooth™. Other alternatives, such as infra red communication is however also conceivable within the inventive concept. Wireless short distance communication is in this connection meant to concern reliable signal or data communication between devices within a range of typically about 10 meters or so.

As shown in FIG. 1, the telephone unit is further coupled or couplable for radio telephone communication 122 to a telephone network 124 such as a stationary telephone network or a radio telephone network that for example operates with a GSM or a GPRS system. The telephone unit may be portable or stationary installed in for example a vehicle.

In a basic embodiment the driving circuitry 103 of the user interface unit 100 is configured with basic functionality for remotely operating the telephone unit 104 by means of key input to and visual feedback from the telephone unit 104 via the user interface 100. Basically, per se known hardware and software constructions already employed in existing telephone units can be used in the driving circuitry of the interface unit. In another wording, the circuitry of the user interface unit is configured to be transparent for or to imitate the signalling, electromechanical and logical properties of a telephone. Whereas the data and signal processing power as well as the proper telephone communication functionality is concentrated to the telephone unit 104, operating functionality such as handling calls, managing phonebook and viewing messages is done via the enhanced interface provided by the user interface unit. A further elaborated embodiment is in addition provided with a microphone 130 and a loudspeaker 132, as well as circuitry 103 that is adapted for driving them. Alternatively or additionally, the user interface may be provided with an input connector 134 and driving circuitry 103 that is adapted for driving a headset. Thus, while manufacturing costs can be kept comparatively low, the inventive user interface is designed to have suitable and convenient shape, size and layout of the input keys and the display for specific ranges of purpose.

Again referring to FIG. 1, an embodiment of the user interface unit comprises one or more external electrical connectors 105 for connecting signal lines 107, 109 from peripheral equipment 108. The user interface unit 100 preferably comprises a slot 126 and connector for an internal battery coupled to the circuitry 103, and for charging purposes preferably also coupled to the power line connection of the connector 105. The peripheral equipment is for example a power supply 128 feeding power to the user interface unit through a power line 109. Another piece of possible peripheral equipment is a vehicle or car hands free system 112 having an electronic circuitry for driving the bands free functionality and being coupled to a loudspeaker 114 and a microphone 115. The peripheral equipment may further be a vehicle information system 116 showing e.g. status information and warning signals to the driver, or a car entertainment system 117 e.g. comprising a radio, a compact disk player and the like. In another embodiment, the user interface apparatus is coupled to a GPS position unit or the like.

Thus coupled to the user interface unit 100, the input and output means of the user interface would be configured to selectively operate also this peripheral equipment. Possibly, the power line 109 can be led together with a signal bus or bundle of cables making up one of the signal lines 107. The electrical connector is preferably adapted to the standard system connector of a telephone model series so that existing accessories such battery chargers, holder and the like can be used together with the user interface unit.

A docking unit 110 in the shape of a holder comprises a corresponding electrical connector 111 that in FIG. 1 is directly coupled to the signal lines 107 and the power line 109 and configured to safely couple to the external connector 105 of the user interface unit 100. The docking unit 110 and the user interface unit 100 have corresponding geometrical shapes such that they fit together and the user interface unit 100 thus can be docked to and held by the docking unit while connecting the electrical connectors 105 and 111. The mentioned geometrical shapes of the user interface unit 100 and the docking unit 110 or specific parts constitute detachable first and second mechanical attachment means 118 and 119 for fitting when in a docked position. The mechanical attachment means may be provided with mechanical locking means for secure locking between the attached user interface unit and the docking unit. In the figure the attachment means have an exemplifying shape, and it should be appreciated that there are many conceivable designs.

In one embodiment a realisation of the invention would comprise the user interface unit, with inter alia the display and other internal components, and a holder as a docking unit for the display. The docking unit would be realised such that it is compatible with the signal cable or signal connector of existing peripheral equipment, for example a car hands free system This embodiment can thereby be made available together with new peripheral equipment or as a complement to already installed peripheral equipment. In the latter case only the holder for the user interface unit has to be coupled to the installed peripheral equipment, possibly exchanging an existing telephone unit holder for the user interface unit holder. In another embodiment, the geometrical shape of the user interface unit 100 is adapted to fit to a holder or a docking unit 110 that also fits to a telephone unit 104. This embodiment makes it possible to supplement a set of hands free equipment and telephone unit with the inventive user interface unit and thereby achieve an enhanced or complementary user interface. These embodiments are beneficial for the manufacturer as well as for the consumer. Furthermore, it is also easy to change usage and for example use a likewise dockable telephone unit that lacks the wireless short distance means together with the peripheral equipment by replacing the user interface unit in the docking unit.

FIG. 2 shows an embodiment of the invention with a user interface unit 200 as described above and an adapter piece 202. The adapter piece 202 is configured to mechanically fit and electrically connect to the user interface unit 200 on one hand, and on the other band to a holder or docking unit 204. The docking unit 204 is in its turn possibly connected to peripheral equipment 206 as described above. The adapter piece 202 thus comprises a first electrical connector 208 adapted for coupling with a corresponding electrical connector 201 of the user interface unit 200 and a second electrical connector 210 adapted for coupling with a corresponding electrical connector 205 of the docking unit 204. Similarly, the adapter piece comprises first mechanical attachment means 212 for mechanically attaching the adapter piece 202 to corresponding mechanical attachment means 203 of the user interface unit 200. Further, the adapter piece comprises second mechanical attachment means 214 for mechanically attaching the adapter piece 202 to corresponding mechanical attachment means 206 the docking unit 204. These and the above mention mechanical attachment means are preferably detachable without tools and may be designed for example as bayonet joints or other form fitting shapes in a per se known manner. The adapter piece may further comprise circuitry 216 that is configured to adapt signals of a first format to signals of a second format for enabling signal communication between a user interface unit of a first type and a docking unit of a second type. This embodiment enables adaptation for coupling and usage of a user interface unit of a first manufacture or model series together with a docking unit of a second manufacture or model series.

The invention has been explained and described by means of examples, but it is understood that it can be realised in a variety of manners within the scope of the accompanying claims.

The invention claimed is:

1. A user interface apparatus for remote control of a telephone, comprising:
   a user interface unit;
   input means configured to input telephone control signals;
   a display for outputting visual information,
   communications means configured for short distance wireless data or signal communication with the telephone;
   circuitry configured to convey input telephone control signals and display control signals between the user interface unit and the telephone by means of the short distance wireless signal communication means;
   wherein the circuitry is configured to be transparent for or to imitate the signaling of the telephone for adapting the input and output signals of the user interface unit to have the same properties as corresponding signals of the telephone; and
   wherein an electrical connector is coupled to the circuitry and configured to connect to signal lines from peripheral equipment of a vehicle to convey signals between the telephone and the peripheral equipment of the vehicle;
   the user interface apparatus further comprising mechanical attachment means configured to detachably attach the user interface unit to corresponding attachment means of a holder, wherein the electrical connector is further configured to connect to a corresponding electrical connector of the holder, wherein the telephone control signals and display control signals comprise key inputs for remotely operating the telephone and wherein the user interface unit is configured to receive, interpret and present on the display visual information that is received from the telephone so as to imitate the signaling, electromechanical and logical properties of the telephone via the display control signal that comprises visual feedback from the telephone unit via the user interface that imitates the signaling, electromechanical and logical properties of the telephone.

2. The user interface apparatus of claim 1, wherein the holder comprises a docking unit.

3. The user interface apparatus of claim 1, wherein the user interface unit is configured to be intermediately coupled between and conveying signals between the telephone and peripheral equipment.

4. The user interface apparatus of claim 3, wherein the peripheral equipment is a hands free system.

5. The user interface apparatus of claim 3, wherein the peripheral equipment is a vehicle information system.

6. The user interface apparatus of claim 3, wherein the peripheral equipment is an entertainment system.

7. The user interface apparatus of claim 3, wherein the user interface apparatus is configured to be coupled to a power supply.

8. The user interface apparatus of claim 1, further comprising a connector slot for a battery, the connector slot being coupled to the circuitry.

9. The user interface apparatus of claim 8, wherein the connector slot is coupled to the electrical connector for connecting to a charging peripheral power supply.

10. The user interface apparatus of claim 1, further comprising a microphone and a loudspeaker coupled to the circuitry.

11. The user interface apparatus of claim 1, further comprising an input connector coupled to the circuitry for connecting a headset.

12. The user interface apparatus of claim 1, further comprising an adapter piece configured to mechanically and electrically fit to first mechanical attachment means and electrical connectors of the user interface unit and to second mechanical attachment means and electrical connectors of a docking unit.

13. The user interface apparatus of claim 1, further comprising an adapter piece having first mechanical attachment means configured to detachably attach to corresponding first mechanical attachment means of the user interface unit and second mechanical attachment means configured to detachably attach to corresponding second mechanical attachment means of a docking unit.

14. The user interface apparatus of claim 1, further comprising an adapter piece having a first electrical connector configured to connect to a corresponding first electrical connector of the user interface unit and a second electrical connector configured to detachably attach to a corresponding second electrical connector of a docking unit.

15. The user interface apparatus of claim 1, further comprising additional circuitry configured to adapt first signals of the user interface unit to second signals of peripheral equipment, and to adapt the second signals of the peripheral equipment to first signals of the user interface.

16. The user interface apparatus of claim 1, further comprising an adapter piece having circuitry configured to adapt first signals of the user interface unit to second signals of a docking unit.

17. The user interface apparatus of claim 1, wherein the display is touch sensitive and together with the circuitry is configured to display input keys for the input means.

18. The user interface apparatus of claim 1, further comprising a portable housing.

19. The user interface apparatus of claim 1, wherein the short distance wireless communication means is based on short distance radio communication.

20. The user interface apparatus of claim 1, wherein the short distance wireless communication means is based on short distance radio communication according to a Bluetooth® standard.

21. The user interface apparatus of claim 1, wherein the short distance wireless communication means is based on infrared signal communication.

22. The user interface apparatus of claim 1, further being configured to provide a first mode of operation with a first set of functionality and a second mode of operation with a second set of functionality, the second set of functionality being a subset of the first set of functionality.

23. The user interface apparatus of claim 22, wherein the second mode of operation is activated in response to the user interface being attached to a docking unit.

24. The user interface apparatus of claim 1, wherein the user interface unit includes a housing, and the input means, the display, the communications means and the circuitry are in the housing.

25. The user interface apparatus of claim 1, wherein the display control signal comprises operating parameters of the telephone, and the user interface unit is configured to receive, interpret and present on the display operating parameters of the telephone that are received as feedback from the telephone via the display control signal.

* * * * *

UNITED STATES PATENT AND TRADEMARK OFFICE
CERTIFICATE OF CORRECTION

| | | |
|---|---|---|
| PATENT NO. | : 8,195,145 B2 | Page 1 of 1 |
| APPLICATION NO. | : 10/554771 | |
| DATED | : June 5, 2012 | |
| INVENTOR(S) | : Angelhag | |

It is certified that error appears in the above-identified patent and that said Letters Patent is hereby corrected as shown below:

In the Claims:
Column 10, Claim 1, Line 1:  Please correct "visual information,"
to read -- visual information; --

Signed and Sealed this
Eighth Day of January, 2013

David J. Kappos
*Director of the United States Patent and Trademark Office*